(12) United States Patent
Okuda

(10) Patent No.: US 7,855,764 B2
(45) Date of Patent: Dec. 21, 2010

(54) ELECTRO-OPTICAL DEVICE AND ELECTRONIC APPARATUS

(75) Inventor: Tatsumi Okuda, Motosu (JP)

(73) Assignee: Sony Corporation, Tokyo (JP)

( * ) Notice: Subject to any disclaimer, the term of this patent is extended or adjusted under 35 U.S.C. 154(b) by 377 days.

(21) Appl. No.: 11/933,573

(22) Filed: Nov. 1, 2007

(65) Prior Publication Data

US 2008/0106673 A1   May 8, 2008

(30) Foreign Application Priority Data

Nov. 2, 2006   (JP) ............. 2006-298554
Aug. 9, 2007   (JP) ............. 2007-207501

(51) Int. Cl.
*G02F 1/13357* (2006.01)
(52) U.S. Cl. ........................ 349/65
(58) Field of Classification Search ............ None
See application file for complete search history.

(56) References Cited

U.S. PATENT DOCUMENTS

| | | | |
|---|---|---|---|
| 2002/0111195 A1* | 8/2002 | Kweon et al. ............. | 455/566 |
| 2004/0080924 A1* | 4/2004 | Chuang .................... | 362/27 |
| 2005/0030727 A1* | 2/2005 | Shimura ................... | 362/26 |
| 2005/0057437 A1* | 3/2005 | Sato ........................ | 345/4 |
| 2005/0073627 A1* | 4/2005 | Akiyama .................. | 349/65 |
| 2006/0087867 A1* | 4/2006 | Kim ......................... | 362/619 |

FOREIGN PATENT DOCUMENTS

| | | | |
|---|---|---|---|
| JP | 2004-46050 | | 2/2004 |
| JP | 2004-128968 A | * | 4/2004 |

* cited by examiner

*Primary Examiner*—Mike Stahl
(74) *Attorney, Agent, or Firm*—K&L Gates LLP

(57) ABSTRACT

An electro-optical device includes a light source, a light guiding plate, a first displaying panel, and a second displaying panel, in which the light guiding plate has an inclined portion which becomes gradually thicker as it becomes nearer the light source, the second displaying panel is arranged on a first side of the light guiding plate, on which the inclined portion is disposed, and the first displaying panel is arranged on a second side of the light guiding plate, on which the inclined portion is not disposed, and an end portion of a displaying region of the second displaying panel is arranged nearer the light source than an end portion of a displaying region of the first displaying panel.

7 Claims, 12 Drawing Sheets

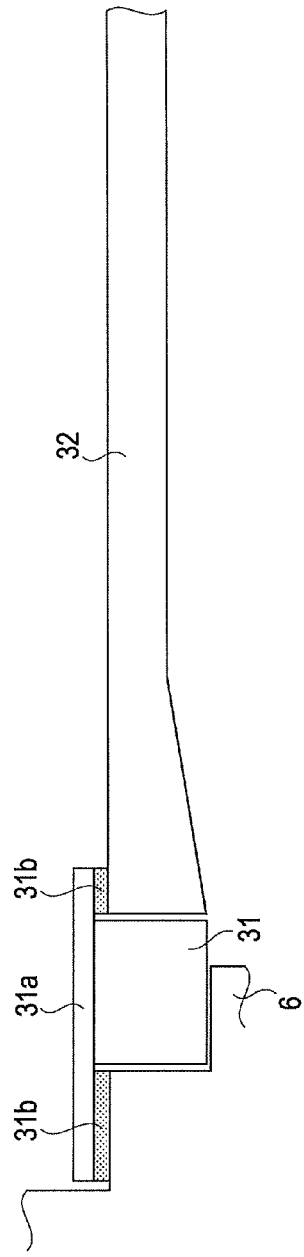
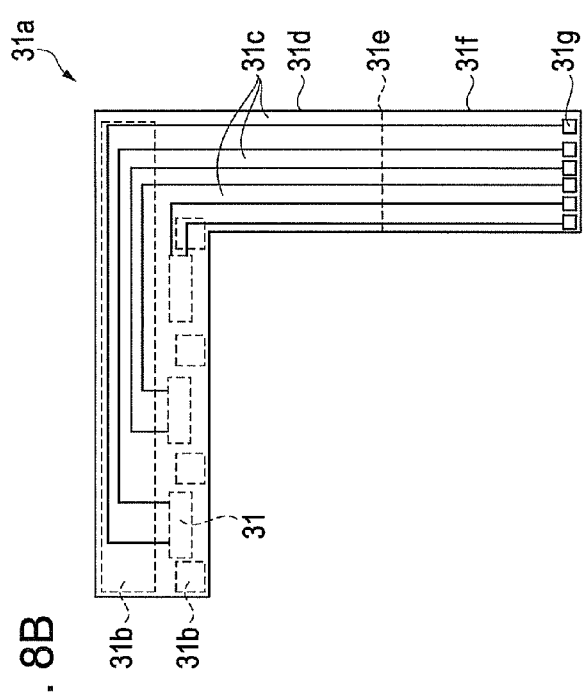
FIG. 8A
FIG. 8B

ELECTRO-OPTICAL DEVICE AND ELECTRONIC APPARATUS

The entire disclosure of Japanese Patent Application Nos. 2006-298554, filed Nov. 2, 2006 and 2007-207501, filed Aug. 9, 2007 are expressly incorporated by reference herein.

BACKGROUND

1. Technical Field

The present invention relates to an electro-optical device and an electronic apparatus, and more particularly to a double-sided displaying type electro-optical device which is less affected by interference fringes and an electronic apparatus having the electro-optical device.

2. Related Art

As for electro-optical devices, liquid crystal display (LCD) devices have been widely used. The liquid crystal display device includes a plurality of pixel regions provided between opposing electrodes and modulates light passing through a liquid crystal material provided at the pixel regions by selectively applying a voltage to the pixel regions, thereby displaying an image of pictures or characters as a whole.

Recently, double-sided displaying type LCD devices have been developed in order to realize multifunctional display devices. However, known double-sided displaying type LCD devices have a problem in that it has relatively lower brightness in comparison with single-sided displaying type liquid crystal display devices, that is, it is impossible to achieve sufficient brightness because light from a single light source and a single light guiding plate enters two liquid crystal panels.

In order to solve the above-mentioned problem, JP-A-2004-46050 discloses another double-sided displaying type LCD device as shown in FIG. 14. In this LCD device, LCD panels 307 and 308 are arranged on both sides of a single light guiding plate 302, respectively, which has an end with a light source 301 thereon, reflective polarizing plates 305 and 306 are interposed between the light guiding plate 302 and the LCD panel 307 and between the light guiding plate 302 and the LCD panel 308, respectively, and transmission axes of the reflective polarizing plates 305 and 306 are adjusted in the following manner.

In greater detail, the transmission axes of the reflective polarizing plates 305 and 306 are aligned with transmission axes of liquid crystal panel polarizing plates 309 and 310, respectively, facing the reflective polarizing plates 305 and 306. That is, the transmission axes of the reflective polarizing plate 305 and the liquid crystal panel polarizing plate 309 disposed on the same side with respect to the light guiding plate 302 are aligned with each other, and the transmission axes of the reflective plate 306 and the liquid crystal panel polarizing plate 310 disposed on the same side with respect to the light guiding plate 302 are aligned with each other. On the other hand, the transmission axes of the reflective polarizing plate 305 and the liquid crystal panel polarizing plate 309 disposed on the same side with respect to the light guiding plate 302 orthogonally intersect the transmission axes of the reflective polarizing plate 306 and the liquid crystal panel polarizing plate 310 disposed on the opposite side across the light guiding plate 302.

However, the double-sided displaying type LCD device disclosed in the above-mentioned patent document still encounters many problems. For example, light from a light source cannot be effectively used and light is not uniformly guided over the entire area of the light guiding plate. As for the double-sided displaying type LCD device, there is a further known technique in which a light guiding plate having an inclined portion (also called a wedge portion) which becomes thicker as it becomes nearer a light source is used in the LCD device. This LCD device also has a problem in that light is apt to leak from the inclined portion and thus interference fringes are easily formed.

SUMMARY

An advantage of some aspects of the invention is that it provides an electro-optical device which is less affected by interference fringes even if the interference fringes are formed by arranging an inclined portion having a predetermined shape at an end of a light guiding plate and carefully configuring relative arrangement of the light guiding plate and a plurality of displaying panels. That is, an advantage of some aspects of the invention is to provide a double-sided displaying type electro-optical device which is less affected by interference fringes and an electronic apparatus including the electro-optical device.

A first aspect of the invention is to provide an electro-optical device including a light source, a light guiding plate, a first displaying panel, and a second displaying panel. The light guiding plate has an inclined portion which becomes thicker as it becomes nearer the light source at an end portion thereof. The second displaying panel is arranged on a first side of the light guiding plate, on which the inclined portion is disposed. The first displaying panel is arranged on a second side of the light guiding plate. An end portion of a displaying region of the first displaying panel is nearer the light source than an end portion of a displaying region of the second displaying panel.

That is, according to the first aspect, the inclined portion having a predetermined shape is provided to the end portion of the light guiding plate and the end portions of the plurality of displaying panels are positioned in association with the position of the inclined portion. With such structure, when light leakage occurs, it is possible to adjust positions of interference fringes such that the interference fringes are formed at a position near the light source on the second displaying panel and formed at a position as far as possible from the light source on the first displaying panel. Thus, it is possible to arrange the first displaying panel and the second displaying panel so as not to be affected by the interference fringes. As a result, it is possible to prevent the interference fringes from influencing on image displaying regions of the first displaying panel and the displaying panel.

In the electro-optical device, it is preferable that area of the image displaying region of the second displaying panel is larger than that of the image displaying region of the first displaying panel.

By taking into consideration of the relationship between areas of the first displaying panel and the second displaying panel, it is possible to more effectively prevent the interference fringes from influencing on the image displaying region of the second displaying panel.

In the electro-optical device, it is preferable that the electro-optical device further includes a frame which covers the light guiding plate and the frame has a frame protrusion which covers surface of the inclined portion of the light guiding plate along the exterior profile of the inclined portion.

By use of the frame having a predetermined structure, the first displaying panel is more strongly secured and the second displaying panel is less affected by the interference fringes. In addition, it is possible to more effectively use light from the light source and thus it is possible to realize the electro-optical device with High brightness.

In the electro-optical device, it is preferable that a light reflective portion (hereinafter, including a light scattering portion) disposed between the frame protrusion and the inclined portion of the light guiding plate.

With the stricture having the light reflection portion at a predetermined position, it is possible to more effectively use light from the light source and to suppress influence of the interference fringes on the second display panel.

In the electro-optical device, it is preferable that the frame protrusion is made of a light reflective member (hereinafter, including a light scattering member).

With the structure of the frame protrusion of the frame, it is possible to simplify the stricture of the frame and to improve light reflective characteristics of the frame protrusion of the frame.

A second aspect of the invention is to provide an electronic apparatus having the electro-optical device. With such structure, it is possible to realize an electronic apparatus having the double-sided displaying type electro-optical device which is less affected by interference fringes.

BRIEF DESCRIPTION OF THE DRAWINGS

The invention will be described with reference to the accompanying drawings, wherein like numbers reference like elements.

FIGS. 8A and 8B are views illustrating a light source circuit substrate mounting a light source thereon according to one example.

DESCRIPTION OF EXEMPLARY EMBODIMENTS

With reference to the accompanying drawings, embodiments of an electro-optical device and an electronic apparatus according to the invention will be described in detail. The embodiments are just provided as examples of the invention and thus the embodiments are not construed to limit the scope of the invention. Thus embodiments can be arbitrarily modified within the scope of the invention.

First Embodiment

Figure 1:
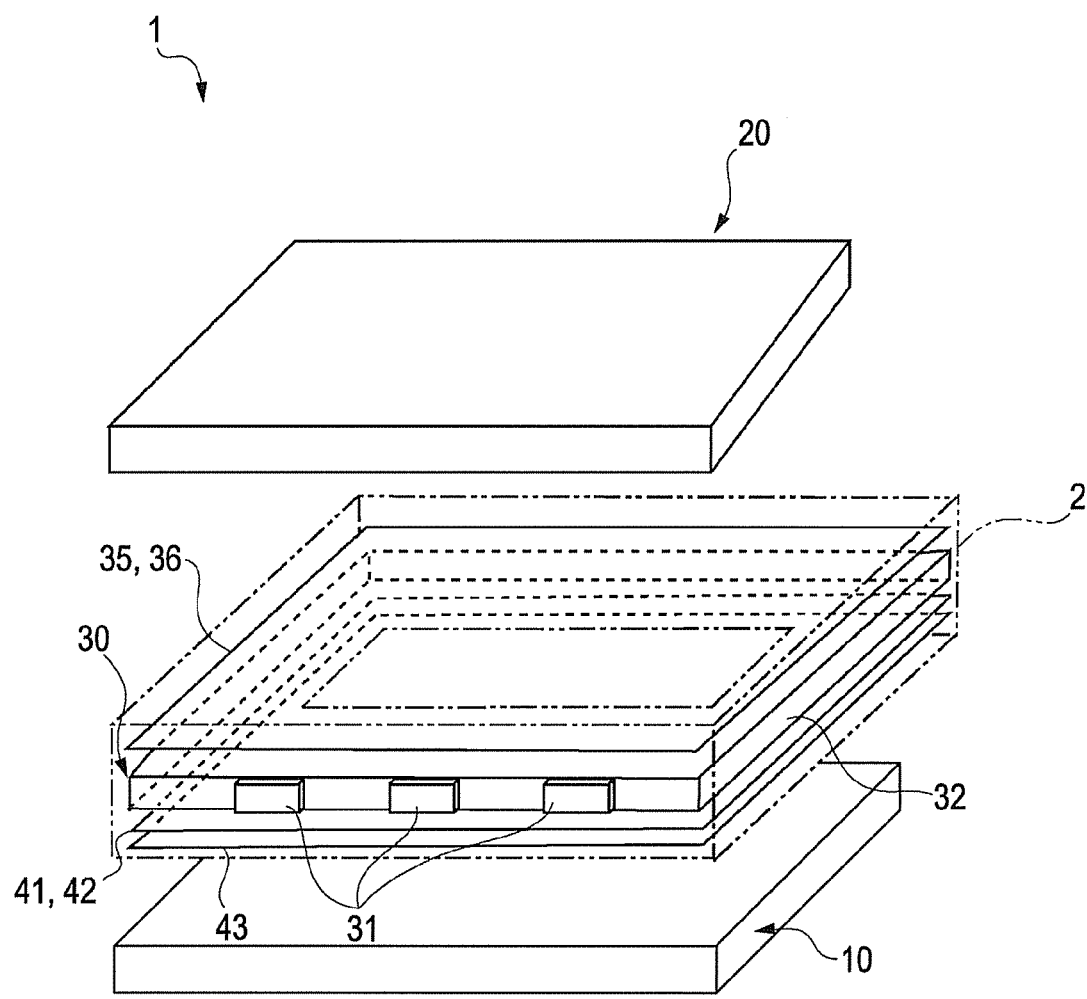
FIG. 1 is a schematic view illustrating a liquid crystal device according to a first embodiment.
Figure 2:
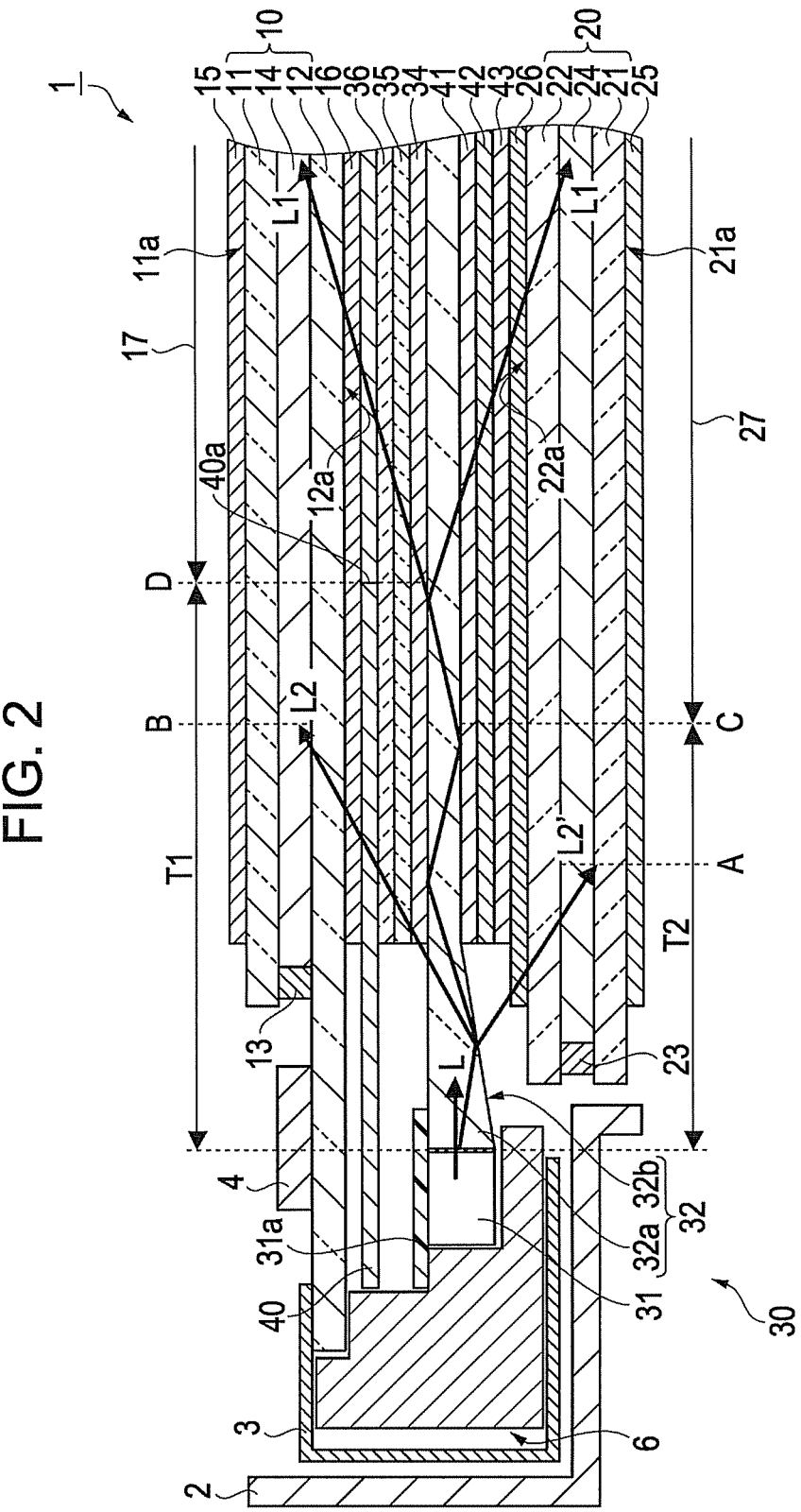
FIG. 2 is a schematic sectional view illustrating the liquid crystal device according to the first embodiment.

As shown in FIGS. 1 and 2, the first embodiment relates to an electro-optical device (liquid crystal device) 1 including a light source 31, a light guiding plate 32, a first displaying panel 10, and a second displaying panel 20. The light guiding plate 32 has an inclined portion 32b which becomes thicker as it becomes nearer the light source 31 at an end portion 32a. The second displaying panel 20 is arranged on a first side of the light guiding plate 42 on which the inclined portion 32b is disposed. The first displaying panel 10 is arranged on a second side of the light guiding plate 32 on which the inclined portion 32b is not disposed. A position of an end portion C of a displaying region 27 of the second displaying panel 20 is nearer the light source 31 than a position of an end portion D of a displaying region 17 of the first displaying panel 20.

Hereinafter, a liquid crystal device including a first displaying panel and a second displaying panel is exemplified as the electro-optical device according to this embodiment. In explanation below, the term "displaying panel" means parts for an optical device and is composed of a pair of substrates attached to each other having a sealed space in between and a liquid crystal material provided in the sealed space between the pair of substrates. The term "liquid crystal device" means an electro-optical device in which a flexible circuit substrate, electronic parts, and a light source are mounted on the displaying panel. For convenience's sake of explanation, the second displaying panel 20 is disposed on an upper side of the first displaying panel 10 in FIG. 1 but conversely is shown on a lower side of the first displaying panel 10 in FIG. 2. Further, the structure of the inclined portion 32b provided at the end portion 32a of the light guiding plate 32 is illustrated in simplified manner in FIG. 1, but is illustrated in emphasized manner in FIG. 2.

Basic Structure

As shown in FIGS. 1 and 2, the liquid crystal device 1 includes the first displaying panel 10 composed of a pair of substrates 11 and 12, the second displaying panel 20 composed of a pair of substrate 21 and 22, and a lighting device 30 which are all received in a casing 2. The second displaying panel 20 has a displaying region 27 having an area which is larger than that of a displaying region 17 of the first displaying panel 10. The first displaying panel 10 and the second displaying panel 20 are arranged in a manner such that at least parts of the first displaying region 17 and the second displaying region 27 overlap each other when viewed in the vertical direction. The lighting device 30 includes a light source 31 and a light guiding plate 32. The light device 30 is used as a shared back light unit for the first displaying panel 10 and the second displaying panel 20.

As shown in FIG. 2, the first displaying panel 10 includes a pair of rectangular substrates 11 and 12 facing each other with a cell gap defined by a sealing member 13 in between and a liquid crystal layer 14 (electro-optical material) interposed between the substrates 11 and 12. The lighting device 30 is arranged near the substrate 12 of the first displaying panel. A light-emission side polarizing plate 15 is disposed on the outer surface 11a of the substrate 11 and a light-incidence side polarizing plate 16 is disposed on the outer surface 12a of the substrate 12. Mounted on the substrate 12 is a driver IC 4 which performs image displaying processing for the first displaying panel 10 and the second displaying panel 20.

As shown in FIG. 2, like the first displaying panel 10, the second displaying panel 20 includes a pair of rectangular substrates 21 and 22 facing each other with a cell gap defined by a sealing member 23 in between and a liquid crystal layer 24 (electro-optical material) interposed between the substrates 21 and 22. The lighting device 30 shared by both the first displaying panel 10 and the second displaying panel 20 is arranged near the substrate 22 of the second displaying panel 20. A light-emission side polarizing plate 25 is disposed on the outer surface 21a of the substrate 21 and a light-incidence side polarizing plate 26 is disposed on the outer surface of the substrate 22. The substrates 11, 12, 21, and 22 are light-transmissible substrates made of a transparent material, such as glass or acryl resin.

Figure 3:
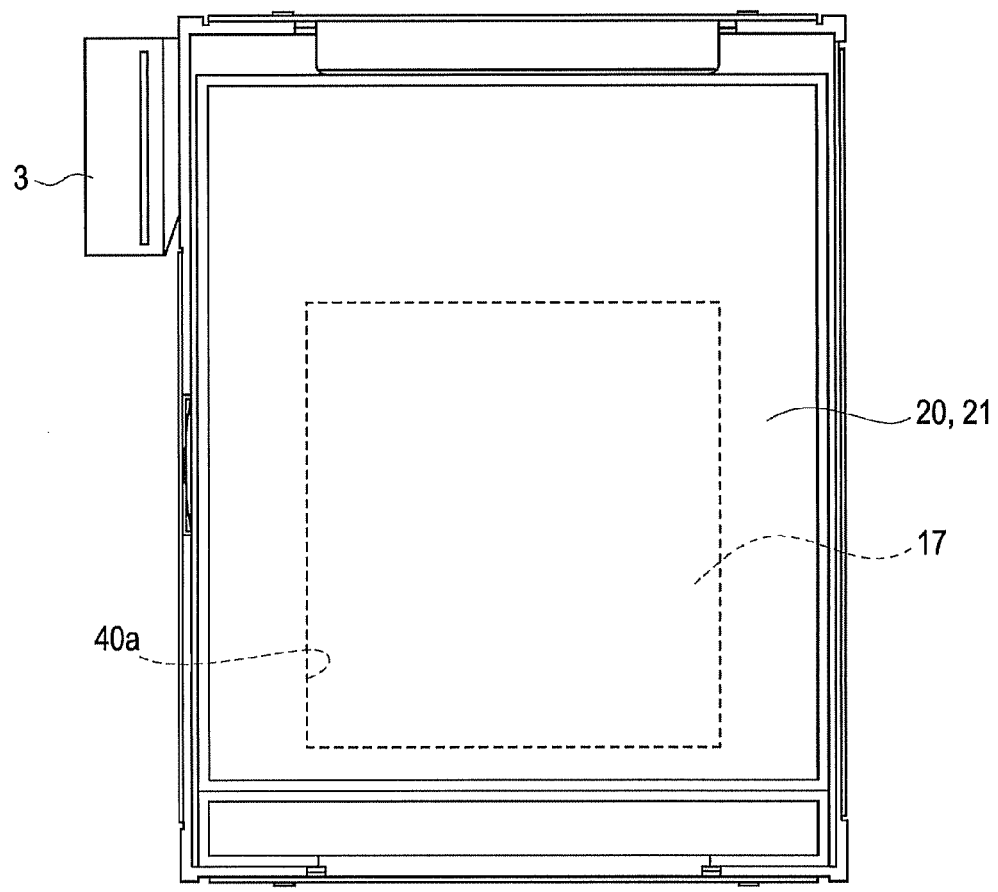
FIG. 3 is a plan view illustrating the front surface of the liquid crystal device according to the first embodiment.
Figure 4:
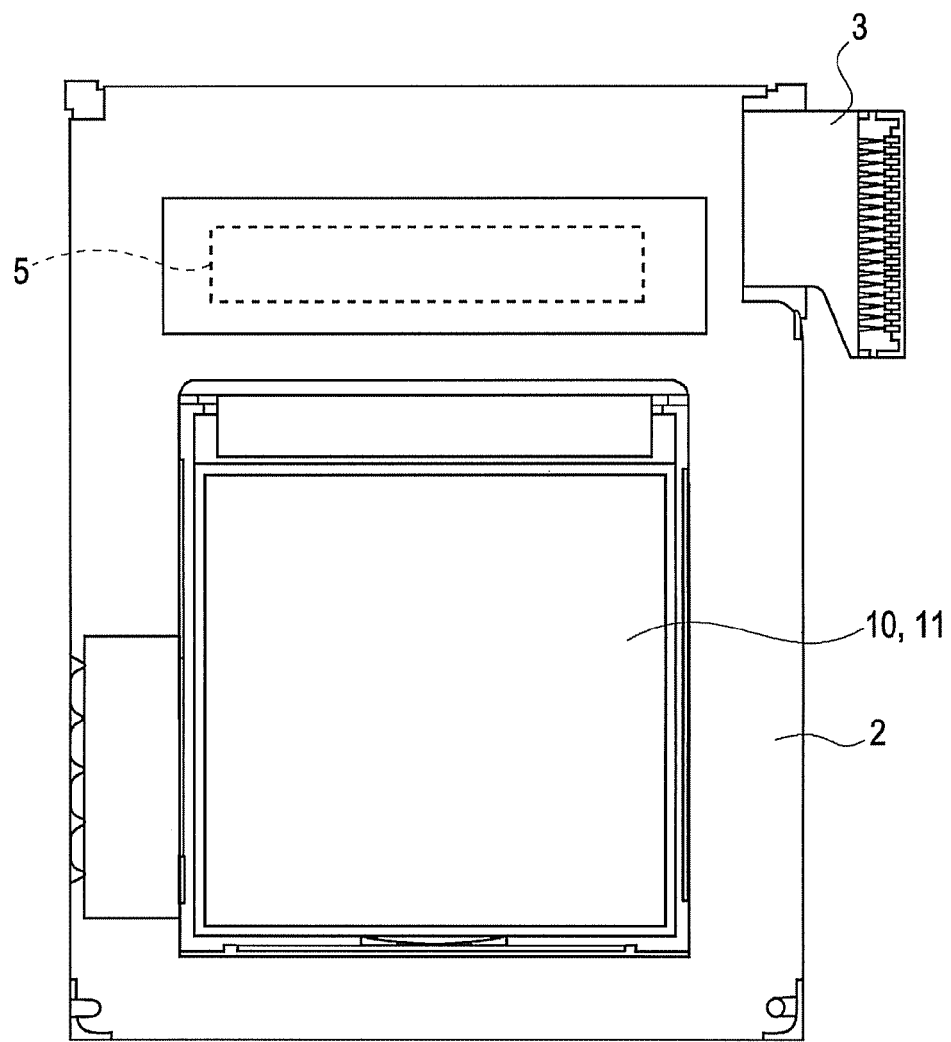
FIG. 4 is a plan view illustrating the rear surface of the liquid crystal device according to the first embodiment.

As shown in FIGS. 3 and 4, a flexible circuit substrate 3 (FPC substrate) 3 is mounted at the end portions of the first displaying panel 10 and the second displaying panel 20 using a conductive material (not shown), such as an unisotrophic conductive film. The FPC substrate 3 is a flexible circuit substrate having flexibility and electronic parts 5 are mounted on the FPC substrate 3. Accordingly, when the light source 31 is lit up in the state in which the driver IC 4 and the electronic parts 5 are controlled, light L from the light source 31 is made incident onto the side of the light guiding plate 32 and is then emitted from the front surface and the rear surface of the light guiding plate 32. By the use of the light emitted from the light guiding plate 32, the first displaying panel 10 and the second displaying panel 20 can perform displaying of a predetermined image.

FIG. 3 shows the front surface of the liquid crystal device 1 according to the first embodiment. In the case in which thickness of the liquid crystal device 1 is not restricted, a light absorbing member 40 which absorbs or reflects light is arranged in the liquid crystal device 1 in order to absorb light leaking from the liquid crystal device 1. In FIG. 3, an opening of the light absorbing member 40 is shown in a dotted line. As shown in FIG. 2, the light absorbing member 40 is disposed between the first displaying panel 10 and the second displaying panel 20. In other words, the light absorbing member 40 is disposed on the rear surface side of the light guiding plate 32, i.e., near the first displaying panel 10. The light absorbing member 40 is disposed at a region other than the displaying region 17 of the first displaying panel 10. Accordingly, as shown in a dotted line in FIG. 3, the light absorbing member 40 has the opening 40a having the same size as the displaying region 17 of the first displaying panel 10. Thanks to the light absorbing member 40 having such structure, it is possible to absorb a light component which is irradiated from the upper surface side of the light guiding plate 32, i.e. from the first displaying panel 10 and which directs toward the region other than the displaying region 17 of the first displaying panel 10, a light component which is reflected from the inner surface of the casing 2 and a frame protrusion 6 of the frame (shown in FIG. 5), and a light component directing from the first displaying panel 10 to the second displaying panel 20.

Accordingly, the light absorbing member 40 affects the second displaying panel 20 in a manner such that it prevents the reflection of the first displaying panel 10 from being visible on the second displaying panel 20 by absorbing the light component emitted from a region in which the first displaying panel 10 is arranged. Further, the light absorbing member 40 affects the first displaying panel 10 in a manner such that it enables light transmission through the first displaying panel 10, precisely through the opening 40a in a region where the first displaying panel 10 is disposed. By arranging the end portion D of the displaying region 17 of the first displaying panel 10 and the end portion C of the displaying region 27 of the second displaying panel 20 near the light source 31, positions of the interference fringes are moved. If the interference fringes are formed outside the displaying regions 17 and 27 of the first displaying panel 10 and the second displaying panel 20, respectively, the above-mentioned advantage may be achieved even lacking the light absorbing member 40.

FIG. 4 shows the rear surface of the liquid crystal device 1 according to the first embodiment. In FIG. 4, the substrate 11 of the first displaying panel 10 is directly shown, and it is shown that the electronic parts 5 are mounted on the first displaying panel 10.

Lighting Device

As shown in FIG. 2, the lighting device 30 includes a frame 6, the light source circuit substrate 31a electrically connected to both the first displaying panel 10 and the second displaying panel 20, the light source 31 mounted on the light source circuit substrate 31a, and the light guiding plate 32 which effectively guides the light L1 emitted from the light source 31 to the first displaying panel 10 and the second displaying panel 20.

FIG. 2 shows positions of the interference fringes formed by the light L2 leaking from the inclined portion 32b of the light guiding plate 32 of the lighting device 30 and the light L2 leaking from a region facing the inclined portion 32b and being reflected from the inclined portion 32b. The position of the interference fringes formed on the first displaying panel 10 is referenced by a reference character B and the position of the interference fringes formed on the second displaying panel 20 is reference by a reference character A.

(1) Frame Structure 1

The frame 6 may have any structure as long as it can receive and protect the light source circuit substrate 31a, the light guiding plate 32, and a light diffusing plate therein. For example, as partially shown in FIG. 2, it is preferable that the frame 6 has a structure having a rectangular exterior as a whole. This is because it is possible to more securely fix the first displaying panel 10 and the second displaying panel 20 by using the frame 6. The rectangular structure can keep the overall size of the lighting device small.

According to the invention, as shown in FIG. 2, the light guiding plate 32 has the inclined portion 32b having a predetermined shape at the end portion 32a thereof, the second displaying panel 20 is arranged on a first side of the light guiding plate 32 on which the inclined portion 32b is disposed, the first displaying panel 10 is arranged on a second side of the light guiding plate 32 on which the inclined portion 32b is not disposed, and the end C portion of the displaying region 27 of the second displaying panel 20 is arranged nearer the light source 31 than the end portion D of the displaying region 17 of the first displaying panel 10. Thanks to such structure, it is possible to vary the positions of the interference fringes, which leads to decrease in influence of the interference fringes on the displaying panels.

In greater detail, when light is leaking from the inclined portion 32b having an inclination angle which is set so as to effectively propagate light L across the light guiding plate 32, the light guiding plate 32 having the inclined portion 32 has the characteristic in which light L2 leaks at a position relatively near the light source 31 on the second displaying panel side of the light guiding plate 32, i.e. on the side on which the inclined portion 32b is disposed and light L2' leaks at a position relatively far from the light source 31 on the first displaying panel side of the light guiding plate 32, i.e. on the side on which the inclined portion 32b is not disposed. Accordingly, in order to compromise such characteristic, the end portion C of the displaying region 27 of the second displaying panel 20 is arranged nearer the light source 31 than the end portion D of the displaying region 17 of the first displaying panel 10. In this manner, it is possible to position the interference fringes outside the displaying regions 17 and 27 of the first and second displaying panels 10 and 20 and to reduce the size of the liquid crystal device 1.

Figure 5:
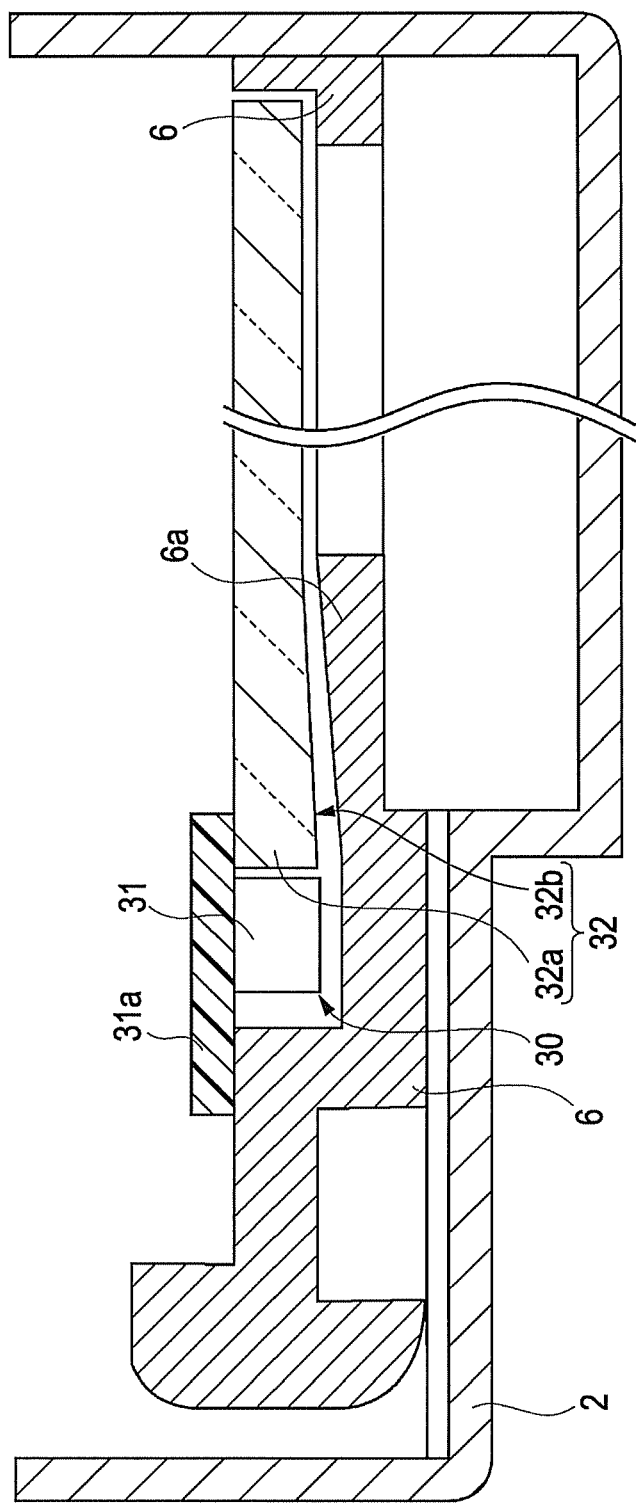
FIG. 5 is a sectional view illustrating a frame used in the liquid crystal device according to the first embodiment.

In addition, as shown in FIG. 5, it is possible to suppress influence of the interference fringes on the displaying panels thanks to the frame protrusion 6a having a predetermined shape and provided to the frame 6. The reason of such advantage will be described later.

(2) Frame Structure 2

In the case in which there is no restriction in space, like the light absorbing member 40, it is preferable that the frame 6 has a frame protrusion 6a at a portion thereof in order to cover the surface of the inclined portion 32b of the light guiding plate 32 along the exterior profile of the light guiding plate 32 and the inclined portion 32.

This is because it is possible to effectively prevent the light from leaking from the inclined portion 32b of the light guiding plate 32 by the presence of the frame protrusion 6a.

Accordingly, it is possible to suppress influence of the interference fringes on the second displaying panel 20. Further, it is possible to reflect the light leaking from the inclined portion 32b on the light guiding plate 32 so as to be returned to the inclined portion 32b, which leads to effectively use the light emitted from the light source 31 and realize the liquid crystal device 1 having high brightness.

By the use of the frame 6 with the frame protrusion 6a having a predetermined shape, it is possible to more securely fix the second displaying panels 20 due to a cornered shape of the frame protrusion 6a.

The advantage of the cornered portion provided at a predetermined portion of the frame will be described in greater detail with reference to FIG. 6.

Figure 6:
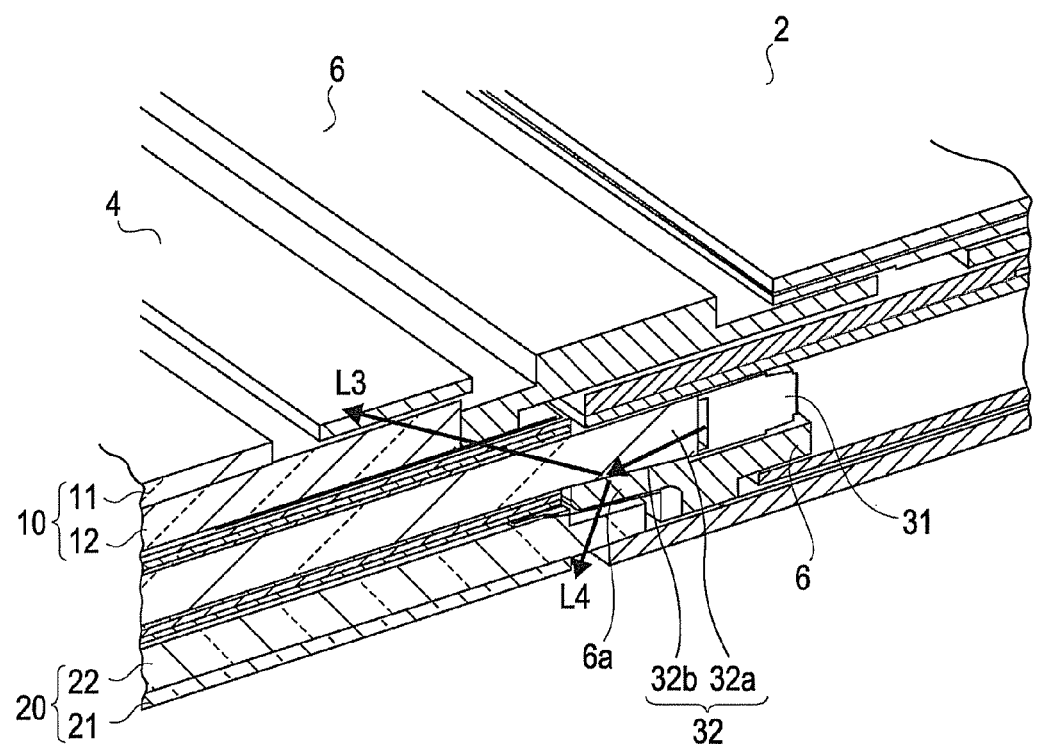
FIG. 6 is a schematic perspective view illustrating the liquid crystal device according to the first embodiment for explaining positions of interference fringes.

FIG. 6 is a view for explaining the position of interference fringes in the liquid crystal device according to the first embodiment. Line 3 represents the position of the interference fringes formed on the first displaying panels 10, and line L4 represents the position of the interference fringes formed on the second displaying panel 20.

In the case in which it is possible to perfectly prevent light from leaking by the presence of the frame protrusion 6a, the interference fringes attributable to the line L4 is not formed. However, even in the case in which it cannot perfectly prevent light from leaking, it is possible to suppress influence of the interference fringes on the second displaying panel 20 because it is possible to effectively reflect the escaping light.

With the structure shown in FIG. 6, it is possible to control formation of the interference fringes or vary the position of the interference fringes. Accordingly, it is possible to realize the liquid crystal device in which both the first displaying panel 10 and the second displaying panel 20 are less affected by the interference fringes. That is, it is possible to suppress influence of the interference fringes on the displaying regions 17 and 27 of the first and second displaying panels 10 and 20 to the minimum.

As shown in FIGS. 5 and 6, the frame protrusion 6a has an angle to the horizontal direction. It is preferable that the angle is set to be equal to an angle of the inclined portion 32b of the light guiding plate 32 and is in a range from 1° to 40°.

With the frame 6 with the frame protrusion 6a, the frame 6 easily engages with the light guiding plate 32 with the inclined portion 32b, and it is possible to easily vary the positions of the interference fringes, which can lead to suppress influence of the interference fringes on the second displaying panel.

Accordingly, it is preferable that the angle of the frame protrusion 6a is set to be in a range from 1° to 20°, and more preferably in a range from 2° to 15°.

Figure 7:
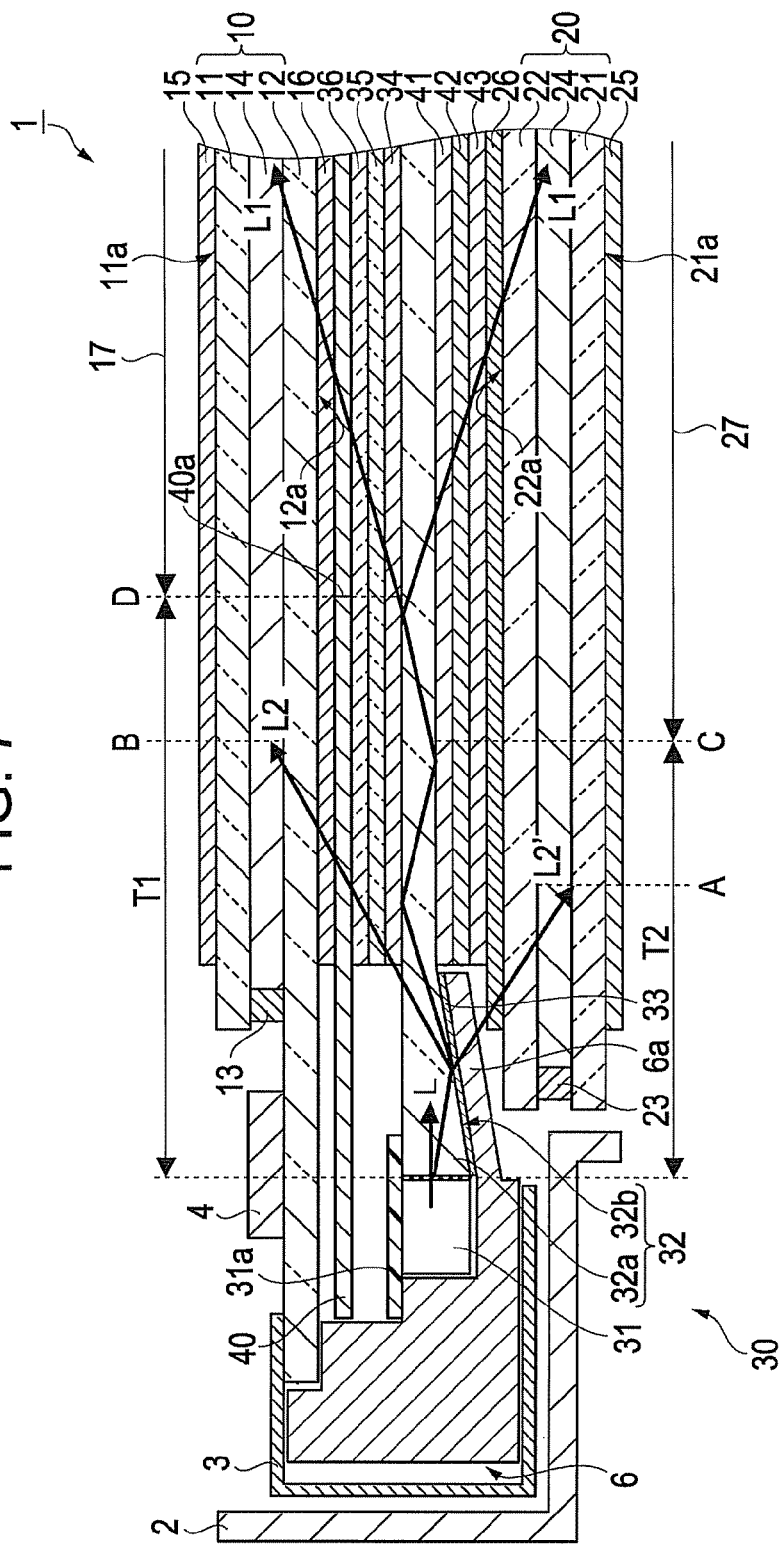
FIG. 7 is a schematic sectional view illustrating a modification of the liquid crystal device according to the first embodiment.

As shown in FIG. 7, it is preferable that a light reflective portion 33 is provided between the frame protrusion 6a and the inclined portion 32b of the light guiding plate 32.

This is because it is possible to effectively prevent the light referenced by L2' from leaking from the inclined portion 32b of the light guiding plate 32 by disposing the light reflective portion 33 at a predetermined position, which leads to suppress influence of the interference fringes on the second displaying panel 20. Even if the light is leaking from the inclined portion 32b of the light guiding plate 32, as shown in FIG. 7, the light is reflected as referenced by L2. Accordingly, it is possible to make the interference fringes be formed at a predetermined position outside the displaying region 17, precisely at a position near the light t source 31.

On the other hand, most of light components L1 is reflected from the interface between the inclined portion 32b of the light guiding plate 32 and the light reflective portion and advances to a position relatively far from the light source 31.

The light reflective portion 33 is constituted by a thin metal reflective member made of aluminum, nickel, copper, silver, chrome, or stainless steel, or by a thin resin layer containing a light reflective material, such as silver particles or aluminum particles therein.

Further, even though it is not shown, it is preferable that the frame protrusion 6a is a light reflective member.

By such structure of the frame protrusion 6a, it is possible to simplify the structure of the frame 6 and improve the light reflective characteristic.

The frame protrusion 6a is preferably made of a metal, such as aluminum, nickel, copper, silver, chrome, and stainless steel, or made of a compound resin containing a light reflective material, such as silver particles or aluminum particles. Accordingly, it is preferable that the entire frame 6 is made of such metal or such compound resin. By such configuration, manufacturing processes of the frame protrusion 6a and the frame 6 are stabilized or simplified. Further, it is possible to improve the light reflective characteristic of the frame protrusion 6a.

(3) Light Source Circuit Substrate

As shown in FIGS. 8A and 8B, a typical example of the light source circuit substrate 31a received in the frame 6 is a flexible circuit substrate on which the light source 31 is mounted.

The light source circuit substrate 31a is a circuit board having a flexible substrate having flexibility, such as polyimide resin, as a base thereof. The light source 31 is mounted on one end portion of the light source circuit substrate 31a and panel connection terminals (not shown) are provided to another end portion of the light source circuit substrate 31a. The light source 31 and the panel connection terminals are electrically connected to each other via electric wires. The light source circuit substrate 31a is attached to the frame 6 with a mounting element 31b interposed there between. According to circumstances, the light circuit substrate 31b is attached to the light guiding plate 32 with the mounting element 31b in between.

Even though it is not shown, the surface of the flexible circuit substrate serving as the light source circuit substrate 31a is covered with a dielectric film except for a mounting region of the light source 31, a mounting region of the panel connection terminals, and a mounting region of test terminals.

The light source 31 mounted on the light source circuit substrate 31a may be generally constituted by a light emitting diode (LED) and alternatively by a fluorescent lamp or a glow lamp.

As shown in FIGS. 8A and 8B, it is preferable that the light source circuit substrate 31a includes a light source mounting portion 31b and extension portions 31d and 31f which are provided to pull out wirings from the from the light source mounting portion 31b.

That is, the light source mounting portion 31b takes generally a rectangular shape and each of the extension portions 31d and 31f takes a strip shape elongated from an end of the light source mounting portion 31b so that a combination of the light source mounting portion 31b and the extension portions 31d and 31f forms the character "L" form as a whole. Further, it is preferable that each extension portion 31d, 31f has a bendable portion (line) 31e in the middle portion thereof so that each extension portion 31d, 31f can be folded inward or outward at the bendable portion 31e.

Thanks to such structure of the light source circuit substrate 31a, it is possible to easily mount the light source circuit substrate 31a on the frame 6 and to easily align the light guiding plate 32 in the frame 6 with the light source circuit substrate 31a.

Figure 9:
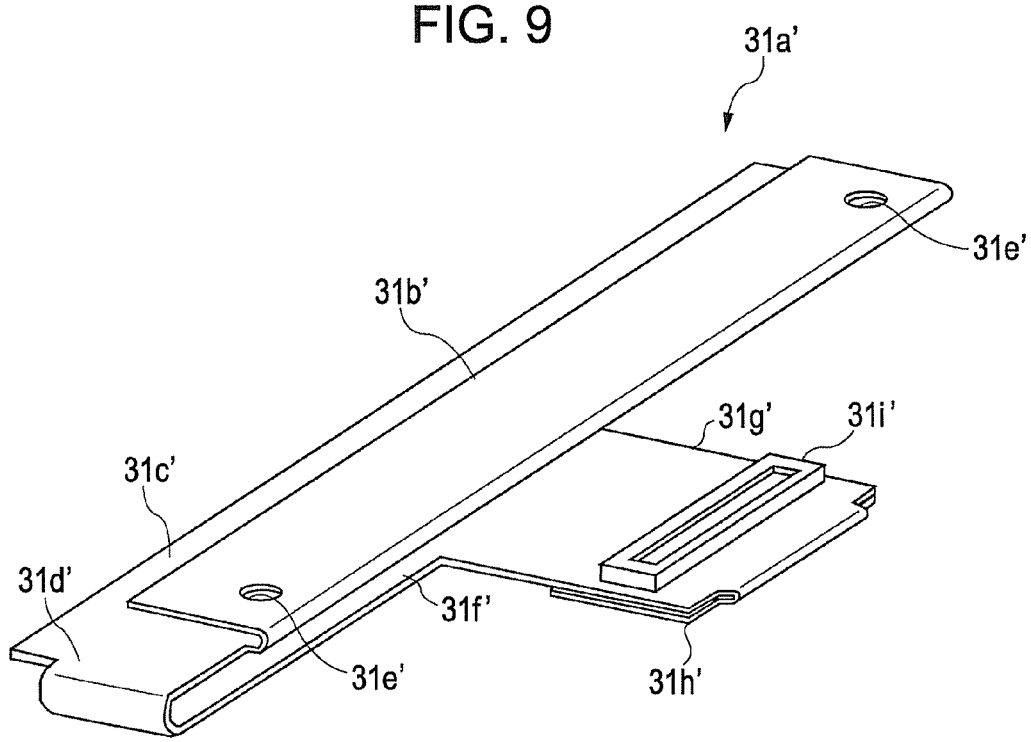
FIG. 9 is a schematic perspective view illustrating a light source circuit substrate according to another example.

FIG. 9 shows another example of a light source circuit substrate 31a' having a light source 31. The light source circuit substrate 31a' has a multi-layered fold-flat structure.

With such multi-layered fold-flat structure, the light source circuit substrate 31a' has high strength even if the light source circuit substrate 31a' is made very thin, contributes to space-saving in the liquid crystal device 1, and also contributes to enlargement of mounting areas.

Further, since the light source circuit substrate 31a' has the multi-layered structure, mountability and alignment characteristics of the light source circuit substrate 31a' to and with the frame 6 are improved.

In the light source circuit substrate 31a' shown in FIG. 9, the light source mounting portion 31b', 31c', and 31f' substantially has a triple-layer structure. Accordingly, it is possible to mount various electronic parts (not shown) as well as the light source (not shown) on the light source mounting portions 31b', 31c', and 31f'.

In the light source circuit substrate 31a' shown in FIG. 9, the lowermost light source mounting portion 31f' has an extension portion 31g' extending from the side thereof and a connector 31i' is provided on the extension portion 31g' so that electronic parts can be connected to the connector 31i'. The leading end of the extension portion 31g' is further folded back so as to form a folded-back portion 31h'.

Figure 11:
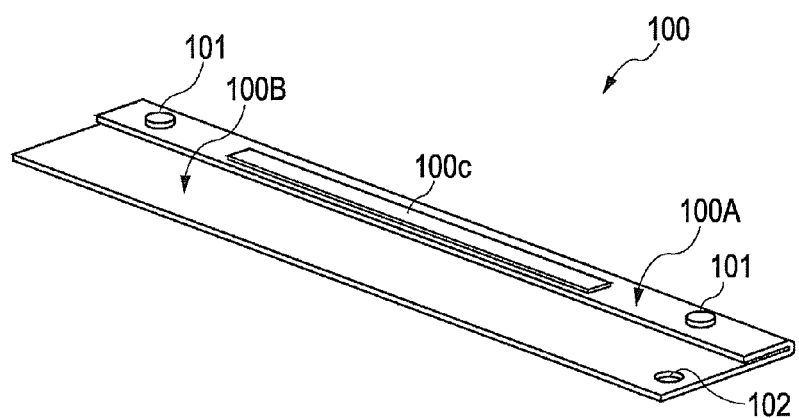
FIG. 11 is a view for explaining a folded plate for a flexible circuit substrate.
Figure 12:
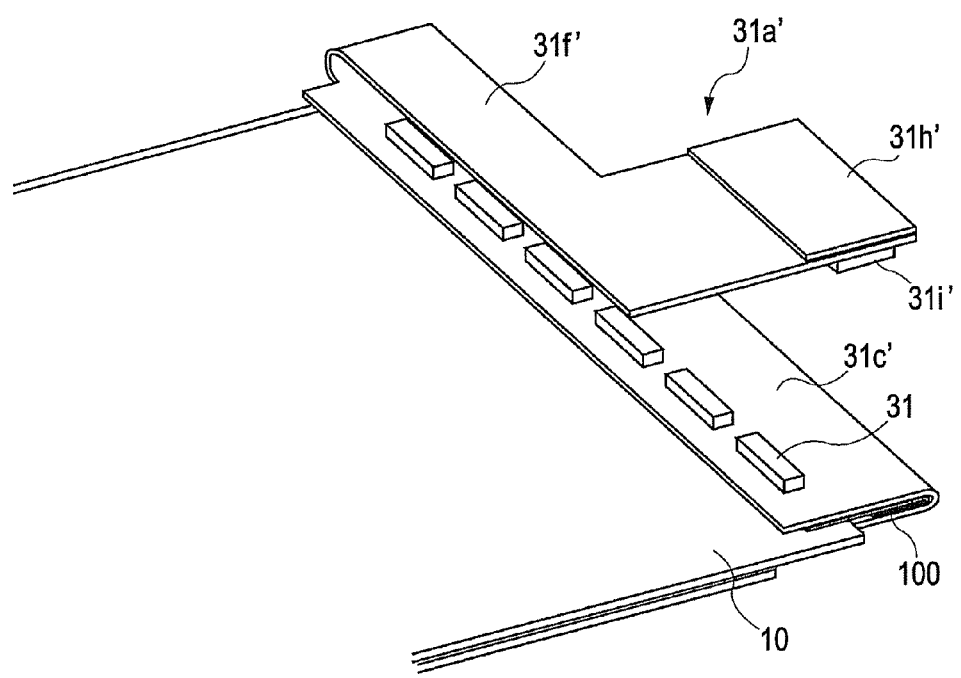
FIG. 12 is a view illustrating mounting condition of the flexible circuit substrate.

Holes 31e' provided at both end portions of the light source circuit substrate 31a' shown in FIG. 9 serve as alignment holes used to align the light source circuit substrate 31a'. That is, the holes 31e' of the light source circuit substrate 31a' and bosses 101 of the folded member 100 shown in FIG. 11 are engaged with each other so that the light source circuit substrate 31a' is quickly fixed and fits to a predetermined position.

Besides, an enforcement plate (not shown) may be prepared. In this case, both the enforcement plate and the light source circuit substrate 31a' may have holes, respectively and a jig is provided so as to pass through the holes of the enforcement plate and the light source circuit substrate 31a'. By the use of the jig, it is possible to easily align the light source circuit substrate 31a'.

(4) Light Guiding Plate

Figure 10A:
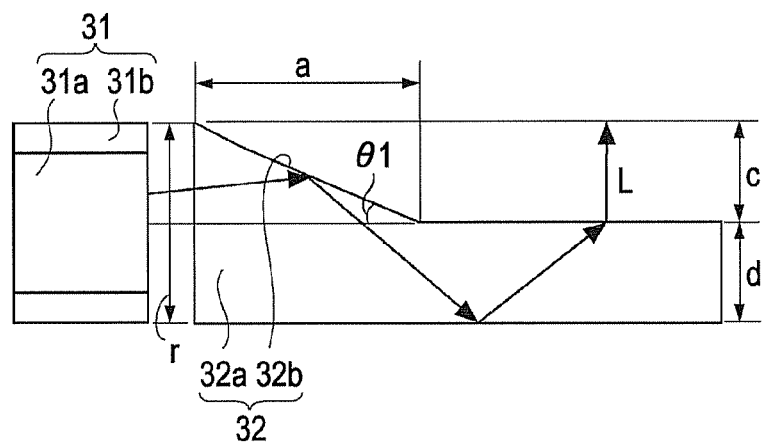
FIGS. 10A and 10B are views for explaining light reflection caused in a light guiding plate used in the liquid crystal device according to the first embodiment.

As shown in FIG. 10A, the light guiding plate 32 having the inclined portion 32b is used in order to guide the light L uniform over the entire surface thereof.

The light guiding plate 32 is a plate member made of a light transmissible material, such as acryl resin. On one side of the light guiding plate, on winch the first displaying panel 10 is arranged, a diffusing sheet 34, a first prism sheet 35, and a second prism sheet 36 are sequentially arranged.

The diffusing sheet 34 is a sheet member having a plate shape which diffuses light emitted from the light guiding plate 32. The diffusing sheet 34 may be formed of an acryl sheet in which a diffusing agent is diffused. By the presence of the diffusing sheet 34, it is possible to level the surface brightness of the light guiding plate 32 and also it is possible to effectively prevent the reflection (brightness unevenness) of trenches or concave-convex forms of the first prism sheet 35 and the second prism sheet 36.

Each of the first prism sheet 35 and the second prism sheet 36 includes a flat-panel shape plate member made of transparent acryl resin and a prism surface provided on one surface which is near the first displaying panel 10. The prism surface has periodic convex-concave irregularities (not shown), each having a triangular side surface.

As shown in FIG. 10A, the light guiding plate 32 has the inclined portion 32b which gradually becomes thicker as it becomes nearer the light source 31 at one end 32a thereof. With such predetermined form of the end portion 32a of the light guiding plate 32, it is possible to effectively use light L from the light source and thus it is possible to realize an electro-optical device having uniform and high brightness.

With reference to FIG. 10A, the angle θ1 of an inclined surface of the inclined portion 32b to the horizontal direction is preferably in a range from 1° to 40°.

When the angle θ1 is in such range, it is possible to more effectively use the light L from the light source 31, and thus it is possible to realize an electro-optical device with more enhanced and uniform brightness.

The angle θ1 is determined depending on material and use of the light guiding plate 32, and it is preferable that the angle θ1 between the inclined surface of the inclined portion 32b and the horizontal direction is in a range from 1° to 20°, and more preferably in a range from 2° to 20°.

Figure 10B:
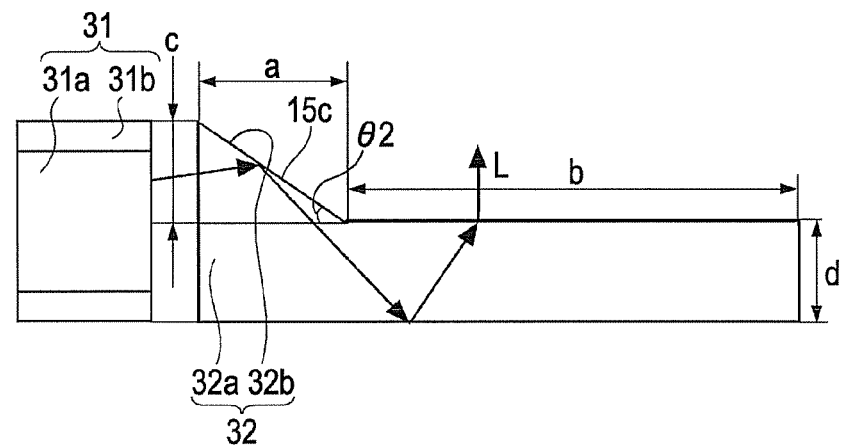

As shown in FIG. 10B, with the structure in which an angle θ2 between the inclined surface of the inclined portion 32b and the horizontal direction is larger than the angle θ1 shown in FIG. 10A, it is possible to make the interference fringes be formed closer to the light source 31 and thus it is possible to expel the interference fringes from the displaying regions 17 and 27. That is, even in the case in which the first displaying panel 10 and the second displaying panel 20 have relatively large are, it is possible to suppress influence of the interference fringes on the first and second displaying panels 10 and 20.

Further, as shown in FIG. 10A, the inclined portion 32b of the light guiding plate 32 is about 0.1 to 5 millimeters long in lateral direction.

By setting the length of the inclined portion 32b to be in a predetermined range, it is more effectively use the light L from the light source 31, and it is possible to improve uniformity of brightness.

The length of the inclined portion 32 is determined depending on the material and use of the light guiding plate 32, but it is preferable that the length "a" of the inclined portion 32b in lateral direction is set to be in a range from 0.3 to 3 millimeters, and more preferably in a range from 0.5 to 2 millimeters.

Still further, as shown in FIG. 10A, the inclined portion 32b is about 0.03 to 3 millimeters thick.

By setting the thickness "c" of the inclined portion 32b is set so as to be in such range, it is possible to more effectively use the light L from the light source and it is possible to improve uniformity of brightness.

The thickness of the inclined portion 32b is determined depending on to the material and use of the light guiding plate 32, but it is preferable that the thickness "c" is set to be in a range from 0.05 to 1 millimeters, and specifically in a range from 0.07 to 0.8 millimeters.

Arrangement of Displaying Panels (1) Arrangement Relationship 1

As shown in FIG. 2, the second displaying panel 20 is arranged on the first side of the light guiding plate 32 on which the inclined portion 32b is disposed, and the first displaying panel 10 is arranged on the second side of the light guiding plate 32 on which the inclined portion 32b is not disposed. Further, the end portion C of the displaying region 27 of the second displaying panel 20 is arranged nearer the light source 31 than the end portion D of the displaying region 17 of the first displaying panel 10.

This is because it is possible to move the positions of the interference fringes to regions outside the displaying regions 17 and 27 of the first and second displaying panels 10 and 20 as denoted by reference characters L2 and L2' even when the light leaks from the inclined portion 32b and the region facing the inclined portion 32b by providing the inclined portion 32b having a predetermined shape to the end portion 32a of the light guiding plate 32 and arranging the first and second displaying panels 10 and 20 taking into consideration of the positions of the end portions C and D of the displaying regions 27 and 17 of the second and first displaying panels 10 and 20.

That is, since it is possible to arrange the first and second displaying panels 10 and 20 avoiding the interference fringes, it is possible to suppress influence of the interference fringes on the displaying regions 17 and 27 of the first and second displaying panels 10 and 20. As shown in FIG. 7, thanks to the frame protrusion 6a provided to the frame 6, it is possible to substantially eliminate influence of the interference fringes on the second displaying panel 20, and it is possible to arrange the end portion C of the displaying region 27 of the displaying panel 20 closer to the light source 31, which leads to realize a large-scale display device.

In addition, in the case of the liquid crystal device 1 shown in FIG. 1, the end portions D and C of the displaying regions 17 and 27 of the first and second displaying panels 10 and 20 may be portions where sealing members 13 and 23 are placed but be other portions where the sealing members 13 and 23 are not placed as long as the displaying regions 17 and 27 of the first and second displaying panels 10 and 27 substantially end at the portions. That is, the end portion D of the displaying region 17 of the first displaying panel 10 can be positioned farther than the region B in which the interference fringes are formed, and the end portion C of the displaying region 27 of the second displaying panel 20 can be positioned farther than the region A in which the interference fringes are formed.

(2) Arrangement Relationship 2

As shown in FIG. 2, it is preferable that a distance T1 between the end portion D of the displaying region 17 of the first displaying panel 10 and the light source 31 is 1.01 to 10 times a distance T2 between the end portion C of the displaying region 27 of the second displaying panel 20 and the light source 31. This is because it is possible to more effectively use the light L from the light source by individually restricting the distances T1 an T2 between the end portions D and C of the displaying regions 17 and 27 of the first and second displaying panels 10 and 20 and the light source 31.

It is more preferable that the distance T1 between the end portion D of the displaying region 17 of the first displaying panel 10 and the light source 31 is 1.2 to 8 times the distance T2 between the end portion C of the displaying region 27 of the second displaying panel 20 the light source 31, and it is much more preferable that the distance T1 is 1.3 to 3 times the distance T2.

Arrangement Relationship 3

It is preferable that area of the displaying region 27 of the second displaying panel 20 is larger than that of the displaying region 17 of the first displaying panel 10.

This is because it is possible to more effectively use the light L from the light source 31 by talking into consideration of the areas of the first displaying panel 10 and the second displaying panel 20.

That is, when the first displaying panel 10 has a small size, it is possible to easily arrange the first displaying panel so as to avoid a position where the interference fringes are formed, which leads to easily suppress influence of the interference fringes on the displaying region 17 of the first displaying panel 10 which serves as an image displaying area.

Further, this arrangement can substantially eliminate influence of the interference fringes on the second displaying panel 20. Accordingly, it is possible to arrange the end portion C of the displaying region 27 of the second displaying panel 20 nearer the light source 31, which leads to increase in size of the displaying region 27 serving as the image displaying area.

That is, by taking into consideration of the areas of the displaying regions 17 and 27 of the first and displaying panels 10 and 20, it is possible to alleviate restriction in the size of the first and second displaying panels 10 and 20 while avoiding influence of the interference fringes on the first and second displaying panels 10 and 20.

Manufacturing Method

The electro-optical device 1 (liquid crystal device) according to the above-mentioned embodiment can be obtained by a manufacturing method of the electro-optical device including the lighting device having the light guiding plate 32 received in the frame 6, the light source 31 which emits light L to the light guiding plate 32, the first displaying panel 10, and the second displaying panel 20.

In greater detail, the manufacturing method of the electro-optical device 1 includes a process of preparing the light-guiding plate 32 having the inclined portion 32b which becomes thicker as it becomes nearer the light source at the one end 32a thereof, allowing the frame 6 to receive the light guiding plate 32 and the light source 31 therein, and arranging the first display panel 10 and the second displaying panel 20 on both sides of the light guiding plate 32. In this arranging process, the second displaying panel 20 is placed on a first side of the light guiding plate 32 on which the inclined portion 32b is disposed, and the first displaying panel 10 is arranged on a second side of the light guiding plate 32 on which the inclined portion 32b is not disposed. In this arranging process, the end portion C of the displaying region 27 of the second displaying panel 20 is arranged nearer the light source 31 than the end portion D of the displaying region 17 of the first displaying panel 10.

That is, the manufacturing method of the electro-optical device 1 includes following first to fourth processes. In the fourth process, the second displaying panel 20 is arranged on the first side of the light guiding plate 32 on which the inclined portion 32b is disposed, and the first displaying panel 10 is arranged on the second side of the light guiding plate 32 on which the inclined portion 32b is not disposed. In this fourth process, the end portion C of the displaying region 27 of the second displaying panel 20 is arranged nearer the light source 31 than the end portion D of the displaying region 17 of the first displaying panel 10:

First (1): preparing the light guiding plate 32 having the inclined portion 32b which becomes gradually thicker as it becomes nearer the light source 31 at the end portion 32a thereof (light guiding plate preparing process);

Second (2): preparing the frame 6 (frame preparing process)

Third (3): placing the light guiding plate 32 in the frame 6 (light guiding plate placing process)

Fourth (4): arranging the first and second displaying panels 10 and 20 on both sides of the light guiding plate 32 (panel arranging process)

(1) Light Guiding Plate Preparing Process

This is a process to prepare the light guiding plate 32 having the inclined portion 32b which becomes thicker as it becomes nearer the light source 31 at one end portion 32a thereof. The light guiding plate 32 partially shown in FIGS. 10A and 10B is prepared by a known injection-molding method.

(2) Frame Preparing Process

Next, the frame 6 which encases the light guiding plate 32 and the light source 31 which emits light L toward the light guiding plate 32 is prepared. The frame 6 is prepared by a known injection-molding method.

In this frame preparing process, the frame 6 is prepared so as to have the frame protrusion 6a which covers the corresponding inclined surface of the inclined portion 32b of the light guiding plate 32, as shown in FIG. 2 or 5.

With such structure, it is possible to male the frame 6 fit the inclined portion 32b of the light guiding plate 32 by the presence of the frame protrusion 6a, which leads to securely fix the second displaying panel 20 to the light guiding plate 32 and to enhance usability of the light L1 from the light source 31.

Upon preparing the frame 6, it is preferable that the light reflective portion 33 is provided between the frame protrusion 6a and the inclined portion 32 of the light guiding plate 32, or the frame protrusion 6a is provided by a light reflective member.

(3) Light Guiding Plate Placing Process

Next, the light guiding plate 32 is placed in the frame 6 in a manner such that the inclined portion 32b engages with the frame protrusion 6a of the frame 6. As shown in FIG. 2, this process is to place the light guiding plate 32 in the frame 6.

(4) Panel Arranging Process

Next, the first and second displaying panels 10 and 20 are arranged on both sides of the light guiding plate 32, respectively. As shown in FIG. 2, the second displaying panel 20 is arranged on the first side of the light guiding plate 32 on which the inclined portion 32b is disposed, and the first displaying panel 10 is arranged on the second side of the light guiding plate 32 on which the inclined portion 32b is disposed. Further in this process, the end portion C of the displaying region 27 of the second displaying panel 20 is arranged nearer the light source 31 than the end portion D of the displaying region 17 of the first displaying panel 10.

By manufacturing the liquid crystal device 1 by providing the inclined portion 32b to the end portion 32a of the light guiding plate 32 and arranging the first displaying panel 10 and the second displaying panel 20 talking into consideration of positions of the end portions D and C of the displaying regions 17 and 27 of the first and second displaying panels 10 and 20, it is possible to substantially eliminate influence of the interference fringes on the second displaying panel 20 and it is possible to suppress influence of the interference fringes on the displaying region 17 serving as an image displaying area of the first displaying panel.

(5) FPC Substrate Mounting Process

In addition, before or after the panel arranging process, as shown in FIGS. 3 and 4, an FPC substrate 3 is mounted on the first displaying panel 10 and the second displaying panel 20 using a conductive material (not shown) so as to serve as an external terminal connector.

The invention is not limited to the FPC substrate 3 shown in FIGS. 3 and 4, but the light source circuit substrate 31a' shown in FIG. 9 may be used as the external terminal connector. That is, in the case in which the first displaying panel 10 and the second displaying panel 20 are thin, as shown in FIG. 11, the first and second displaying panels 10 and 20 are engaged with the folded member 100 and the light source circuit substrate 31a' is mounted on the folded member 100 using a conductive material (not shown).

In this case, functions of the light source circuit substrate 31a' and the FPC substrate 3 serving as the external terminal connector are performed by one element, and thus it is possible to save a large space. Further, since the light source circuit substrate 31a' is folded back by an angle of 180°, rebound resilience is strong even if the light source circuit substrate 31a' is very thin. The folded member 100 can restrict the rebound resilience of the light source circuit substrate 31a'.

In order to more highly restrict the rebound resilience of the light source circuit substrate 31a', an adhesive layer or a glue layer 100c is provided to the folded member 100 in order to secure coupling of the folded member 100 and the light source circuit substrate 31a'. The folded member 100 shown in FIG. 11 may take a film form made of a metal, such as stainless steel or aluminum, a ceramic material, or a plastic material.

Second Embodiment

The second embodiment relates to an electronic apparatus having the electro-optical device (liquid crystal device 1) according the first embodiment.

Figure 13:
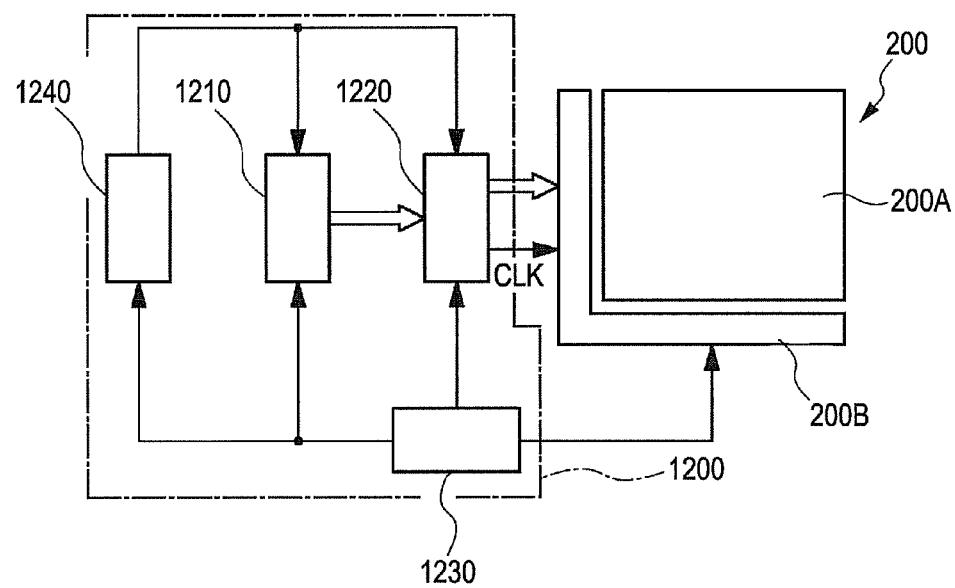
FIG. 13 is a schematic block diagram illustrating overall structure of an electronic apparatus according to a second embodiment.
Figure 14:
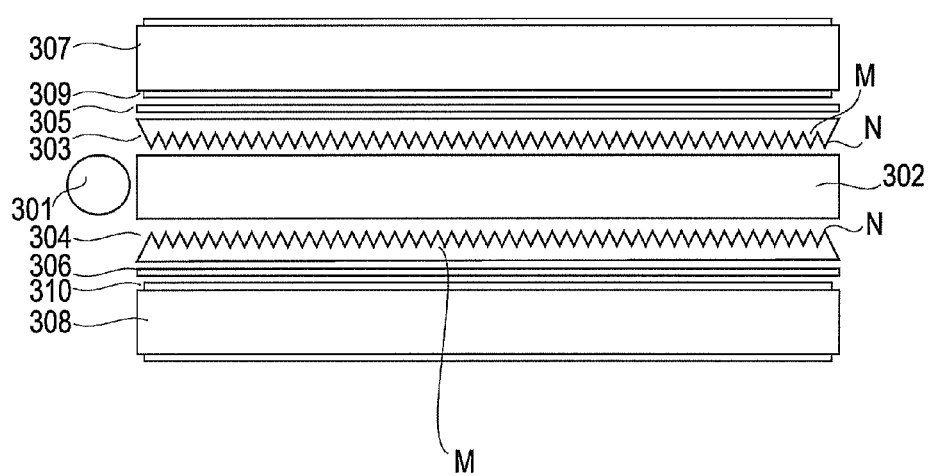
FIG. 14 is a view illustrating a double-sided displaying type liquid crystal display device according to a known art.

FIG. 13 shows the overall structure of the electronic apparatus according to this embodiment. The electronic apparatus includes a displaying panel 200A included in a liquid crystal device 200 and a control unit 200B which controls operations of the display panel 200A. The control unit 200B includes a display information output source 1210, a display processing circuit 1220, a power source circuit 1230, and a timing generator 1240.

The display information output source 1210 may include a memory unit comprised of a Read Only Memory (ROM) and/or a Random Access Memory (RAM), a storage unit comprised of a magnetic recording disk and/or an optical recording disk, and a tuning circuit which outputs digital image signals after tuning signals. The display information output source 1210 supplies display information in a form of image signals having a predetermined format to the display processing circuit 1220 on the basis of a variety of clock signals CLK generated by the timing generator 1240.

The display processing circuit 1220 includes a variety of known circuits, such as a serial-to-parallel converter circuit, an amplifying-inverting circuit, a rotation circuit, a gamma correction circuit, and a clamp circuit performs processing of the display information, and supplies the image signals and the clock signals CLS together to a driving circuit in the control unit 200B. The driving circuit can include a first electrode driving circuit, a second electrode circuit, and a test circuit. The power source circuit 1230 functions to supply predetermined voltages to the above-mentioned elements.

The electronic apparatus according to this embodiment may include the lighting device in which a light guiding plate 32 has an inclined portion 32b which becomes thicker as it becomes nearer a light source 31 at an end portion 32a thereof and the inclined portion 32b has an inclined surface or a curved surface at a position where it faces the light source 31, and thus the lighting device has uniform brightness and high optical reliability.

According to the invention, provided is the double-sided displaying type electro-optical device which is less affected by the interference fringes, which is achieved by providing the inclined portion having a predetermined shape to an end portion of the light guiding plate and arranging displaying panels while talking into consideration of the inclined portion of the light guiding plate, relative arrangement of the displaying panels, and positions of the end portions of the displaying panels, and further provided is the electronic apparatus having the electro-optical device. Accordingly, the electro-optical device of the invention can be applied to electronic apparatus having a liquid crystal device including switching elements such as TFT elements or TFD elements. For example, the electro-optical device of the invention may be applied to a mobile phone, a personal computer, a liquid crystal TV set, a view-finder type monitor, a direct-view type vide tape recorder, a car navigation device, a pager, an electrophoretic device, an electronic organizer, a calculator, a word processor, a workstation, a video conferencing phone, a POS terminal, an electronic apparatus with a touch panel, and an electronic apparatus with a field emission element (FED: Field Emission Display or SCEED: Surface-Conduction Electron-Emitter Display).

What is claimed is:

1. An electro-optical device, comprising:
   a light source;
   a light guiding plate extending in a first direction and having a first side and a second side opposite the first side, the light guiding plate consisting of a first major portion and a second major portion, the first major portion having a first surface inclined on the first side relative to the second major portion, the first major portion becoming gradually thicker nearer the light source and the second major portion having a constant thickness;
   a first displaying panel arranged on the second side of the light guiding plate and extending along the light guiding plate in the first direction;
   a second displaying panel arranged on the first side of the light guiding plate and extending along the light guiding plate in the first direction; and
   a frame receiving the light guiding plate therein, the frame having a frame protrusion covering the first surface of the first major portion of the light guiding plate on the first side along an exterior profile of the light guiding plate,
   wherein an end portion of a displaying region of the second displaying panel nearest the light source is arranged nearer the light source in the first direction than an end portion of a displaying region of the first displaying panel nearest the light source.

2. The electro-optical device according to claim 1, wherein an area of the displaying region of the second displaying panel is larger than that of the displaying region of the first displaying panel.

3. The electro-optical device according to claim 1, further comprising a light reflective portion disposed between the frame protrusion of the frame and the first major portion of the light guiding plate.

4. The electro-optical device according to claim 1, wherein the frame protrusion is formed of a light reflective member.

5. An electronic apparatus including the electro-optical device according to claim 1.

6. An electro-optical device, comprising:
   a light source;
   a light guiding plate extending in a first direction and having a first side and a second side opposite the first side, the light guiding plate including a first major portion inclined on the first side relative to a second major portion of the light guiding plate different than the first major portion, the first major portion becoming gradually thicker nearer the light source;
   a first displaying panel arranged on the second side of the light guiding plate and extending along the light guiding plate in the first direction;
   a second displaying panel arranged on the first side of the light guiding plate and extending along the light guiding plate in the first direction; and
   a frame receiving the light guiding plate therein, the frame having a frame protrusion covering a first surface of the first major portion of the light guiding plate on the first side along an exterior profile of the light guiding plate,
   wherein an end portion of a displaying region of the second displaying panel nearest the light source is arranged nearer the light source in the first direction than an end portion of a displaying region of the first displaying panel nearest the light source, and
   wherein the frame protrusion includes a second surface parallel to and covering the first surface of the first major portion of the light guiding plate.

7. An electro-optical device, comprising:
   a light source;
   a light guiding plate extending in a first direction and having a first side and a second side opposite the first side, the light guiding plate including a first major portion inclined on the first side relative to a second major portion of the light guiding plate different than the first major portion, the first major portion becoming gradually thicker nearer the light source;
   a first displaying panel arranged on the second side of the light guiding plate and extending along the light guiding plate in the first direction;
   a second displaying panel arranged on the first side of the light guiding plate and extending along the light guiding plate in the first direction; and
   a frame receiving the light guiding plate therein, the frame having a frame protrusion covering a first surface of the first major portion of the light guiding plate on the first side along an exterior profile of the light guiding plate,
   wherein an end portion of a displaying region of the second displaying panel nearest the light source is arranged nearer the light source in the first direction than an end portion of a displaying region of the first displaying panel nearest the light source, and
   wherein the frame protrusion engages the first surface of the first major portion of the light guiding plate.

* * * * *